(12) United States Patent
Sturgin

(10) Patent No.: US 7,980,992 B2
(45) Date of Patent: Jul. 19, 2011

(54) MULTI FUNCTION TORQUE CONVERTER WITH TURBINE ENGINE IDLE DISCONNECT AND METHOD OF CONTROLLING A MULTI FUNCTION TORQUE CONVERTER FOR ENGINE IDLE DISCONNECT

(75) Inventor: Todd Sturgin, Shreve, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 726 days.

(21) Appl. No.: 11/999,949

(22) Filed: Dec. 7, 2007

(65) Prior Publication Data

US 2008/0149440 A1 Jun. 26, 2008

Related U.S. Application Data

(60) Provisional application No. 60/874,104, filed on Dec. 11, 2006.

(51) Int. Cl.
*F16D 33/00* (2006.01)
*F16D 35/00* (2006.01)
*F16D 37/00* (2006.01)
*F16H 61/38* (2006.01)

(52) U.S. Cl. ........ 477/53; 192/3.26; 192/3.27; 192/3.28

(58) Field of Classification Search .............. 477/52–54, 477/61–63; 192/3.26–3.29
See application file for complete search history.

(56) References Cited

U.S. PATENT DOCUMENTS

| | | | | |
|---|---|---|---|---|
| 3,235,043 A * | 2/1966 | Maurice et al. | ............... | 192/3.25 |
| 3,542,174 A * | 11/1970 | Hattori | .......... | 192/3.26 |
| 4,673,071 A * | 6/1987 | Moroto et al. | ............... | 192/3.21 |
| 4,733,761 A * | 3/1988 | Sakakibara | ............... | 192/3.25 |
| 4,844,216 A * | 7/1989 | Fukushima | .................. | 192/3.26 |
| 5,020,646 A * | 6/1991 | Koshimo | ..................... | 192/3.25 |
| 5,103,947 A * | 4/1992 | Okuzumi | ..................... | 192/3.25 |
| 5,400,884 A * | 3/1995 | Matsuoka | .................... | 192/3.25 |
| 5,685,404 A * | 11/1997 | Fukushima | .................. | 192/3.26 |
| 5,860,500 A * | 1/1999 | Olsen et al. | .................. | 192/3.29 |
| 5,881,852 A | 3/1999 | Fukushima | | |
| 5,992,589 A * | 11/1999 | Fukushima | .................. | 192/3.29 |
| 6,648,112 B2 * | 11/2003 | Suzuki | .......................... | 192/3.25 |
| 6,974,008 B2 * | 12/2005 | Leber | ........................... | 192/3.25 |
| 2007/0074943 A1 * | 4/2007 | Hemphill et al. | ............ | 192/3.25 |
| 2008/0149442 A1 | 6/2008 | Sturgin | | |

FOREIGN PATENT DOCUMENTS

| | | |
|---|---|---|
| DE | 19714479 | 10/1997 |
| DE | 19812686 | 7/1999 |

* cited by examiner

*Primary Examiner* — Tisha D Lewis
(74) *Attorney, Agent, or Firm* — Simpson & Simpson, PLLC

(57) ABSTRACT

A torque converter including a damper assembly connected to a hub for the torque converter; a turbine clutch connected to a turbine and the damper assembly; and a torque converter clutch connected to a cover for the torque converter and the damper assembly. In an idle mode, the turbine clutch and the torque converter clutch are disengaged and the torque converter cover is rotationally disconnected from the hub. In a torque converter mode, the turbine clutch is engaged, the torque converter clutch is disengaged, and the turbine clutch rotationally locks the turbine and the damper assembly. In a lock-up mode, the torque converter clutch is engaged and the torque converter clutch rotationally connects the torque converter cover and the damper assembly.

17 Claims, 12 Drawing Sheets

MULTI FUNCTION TORQUE CONVERTER WITH TURBINE ENGINE IDLE DISCONNECT AND METHOD OF CONTROLLING A MULTI FUNCTION TORQUE CONVERTER FOR ENGINE IDLE DISCONNECT

CROSS-REFERENCE TO RELATED APPLICATIONS

This application claims the benefit under 35 U.S.C. §119 (e) of U.S. Provisional Application No. 60/874,104 filed Dec. 11, 2006 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a multi function torque converter with a turbine that is controllably connectable to an output hub for the torque converter. Specifically, the turbine can be disconnected from the hub during engine idle mode.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

It is desirable to increase the fuel economy of an engine, connected to a torque converter, while the engine is idling. Thus, there is a long-felt need for a torque converter able to reduce the inertial load on an engine during idle. In particular, there is a long-felt need for a torque converter with portions, such as the turbine, disconnectable from the engine during engine idle.

BRIEF SUMMARY OF THE INVENTION

The present invention broadly comprises a torque converter including a damper assembly connected to a hub for the torque converter; a turbine clutch connected to a turbine and the damper assembly; and a torque converter clutch connected to a cover for the torque converter and the damper assembly. In an engine idle mode, the turbine clutch and the torque converter clutch are disengaged and the torque converter cover and the turbine are rotationally disconnected from the hub. In a torque converter mode, the turbine clutch is engaged, the torque converter clutch is disengaged, and the turbine clutch rotationally connects the turbine and the damper assembly. In a lock-up mode, the torque converter clutch is engaged and the torque converter clutch rotationally connects the torque converter cover and the damper assembly.

In some aspects, the turbine clutch includes a first piston plate and the torque converter clutch includes a second piston plate. The torque converter includes an impeller; a turbine shell; a first chamber including the turbine and the impeller and at least partially defined by the first and second piston plates; a second chamber at least partially defined by the first piston plate and the turbine shell; and a third chamber at least partially defined by the torque converter cover and the second piston plate. Then, in engine idle mode, pressure for fluid in the first chamber is arranged to be less than pressures for respective fluids in the second and third chambers.

In some aspects, the turbine clutch includes a first piston plate and the torque converter clutch includes a second piston plate. The torque converter includes an impeller; a turbine shell; a first chamber including the turbine and the impeller and at least partially defined by the first and second piston plates; a second chamber at least partially defined by the first piston plate and the turbine shell; and a third chamber at least partially defined by the torque converter cover and the second piston plate. Then, in torque converter mode, pressure for fluid in the first chamber is arranged to be less than pressure for fluid in the third chamber and pressure for fluid in the first chamber is arranged to be greater than pressure for fluid in the second chamber. The fluid in the first chamber is arranged to flow through the first chamber to cool the turbine and impeller.

In some aspects, the turbine clutch includes a first piston plate and the torque converter clutch includes a second piston plate. The torque converter includes an impeller; a turbine shell; a first chamber including the turbine and the impeller and at least partially defined by the first and second piston plates; a second chamber at least partially defined by the first piston plate and the turbine shell; and a third chamber at least partially defined by the torque converter cover and the second piston plate. Then, in lock-up mode, pressure for fluid in the first chamber is arranged to be greater than pressure for fluid in the third chamber.

The present invention also broadly comprises a torque converter including a damper assembly connected to a hub for the torque converter; a turbine clutch in a first torque path between a turbine and the damper assembly; and a torque converter clutch in a second torque path between a cover for the torque converter and the damper assembly. In an engine idle mode, the turbine clutch and the torque converter clutch are disengaged and the first and second torque paths are discontinuous. In a torque converter mode, the turbine clutch is engaged, the torque converter clutch is disengaged, the first torque path is continuous and the second torque path is discontinuous. In a lock-up mode the torque converter clutch is engaged and the second torque path is continuous.

The present invention further broadly comprises a torque converter presenting a reduced inertial load during engine idle mode, including an output hub and a turbine arranged to rotate independent of the output hub. In some aspects, the torque converter includes a damper assembly connected to the hub and to a torque converter cover, and a turbine clutch connected to a turbine and the damper assembly. The turbine clutch is arranged to open during the engine idle mode.

The present invention broadly comprises a method of operating a torque converter including the steps of varying hydraulic pressure in first, second and third chambers; and manipulating respective torque transmission paths between a cover for the torque converter and a damper assembly connected to a hub and between a turbine and the damper assembly in response to varying the hydraulic pressure.

In some aspects, varying hydraulic pressure includes maintaining pressure in the first chamber at a level lower than the respective pressures in the second and third chambers and manipulating respective torque transmission paths includes opening the respective torque transmission paths.

In some aspects, varying hydraulic pressure includes maintaining pressure in the first chamber at a level lower than the pressure in the third chamber and maintaining pressure in the second chamber at a pressure lower than the pressure in the first chamber and manipulating respective torque transmission paths includes opening the torque transmission path between the cover and the damper assembly and closing the torque transmission path between the turbine and the damper assembly. Then, the method includes flowing the fluid in the first chamber through the first chamber.

In some aspects, varying hydraulic pressure includes maintaining pressure in the first chamber at a level higher than the pressure in the third chamber and manipulating respective torque transmission paths includes closing the torque transmission path between the cover and the damper assembly.

It is a general object of the present invention to provide a means of isolating an output hub for a torque converter during an engine idle mode.

It is another object of the present invention to provide a torque converter with turbine and torque converter clutches both transmitting torque through a damper assembly.

It is a further object of the present invention to provide a torque converter that isolates an output hub during engine idle mode and provides cooling flow to the torus while hydraulically operating clutches in a torque converter mode.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
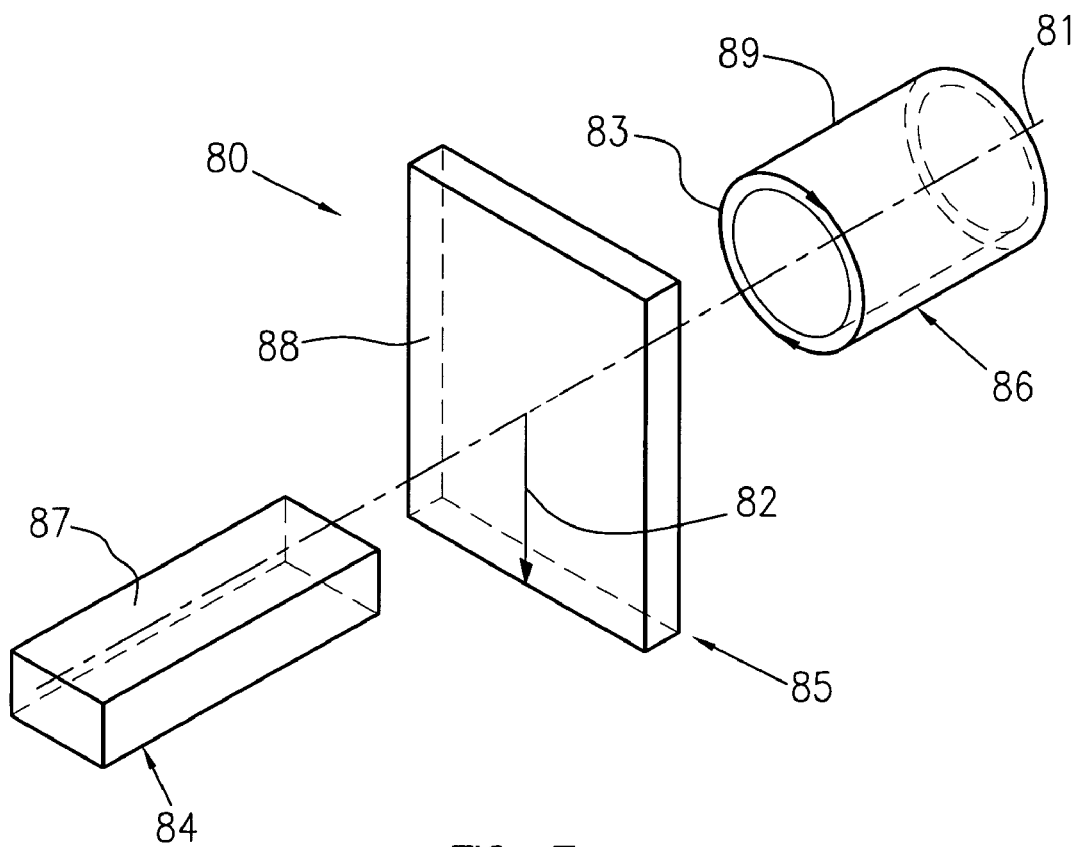
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
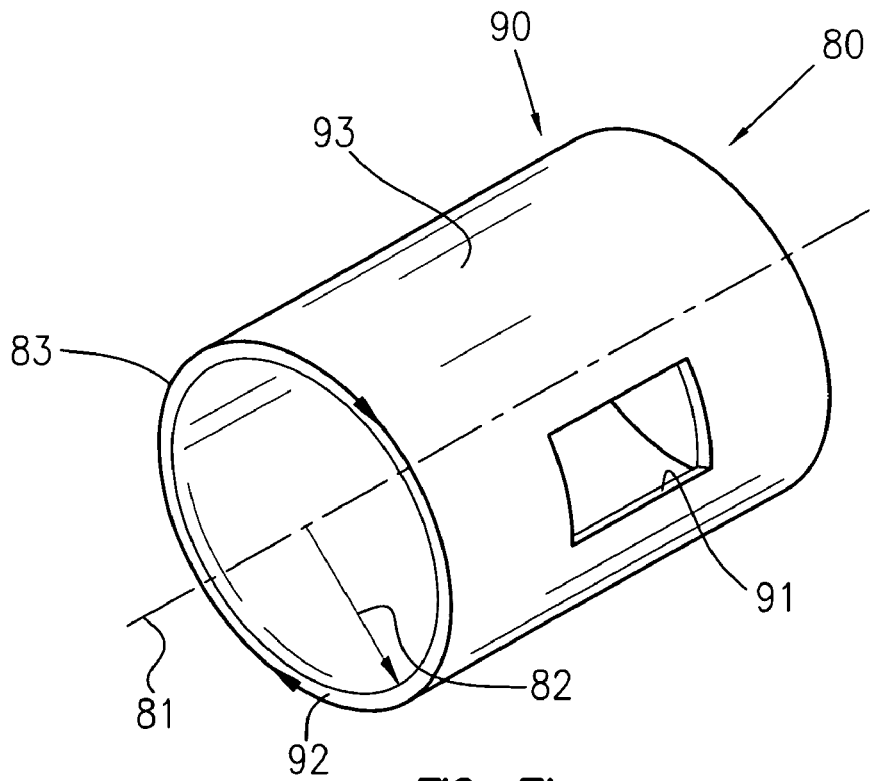
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
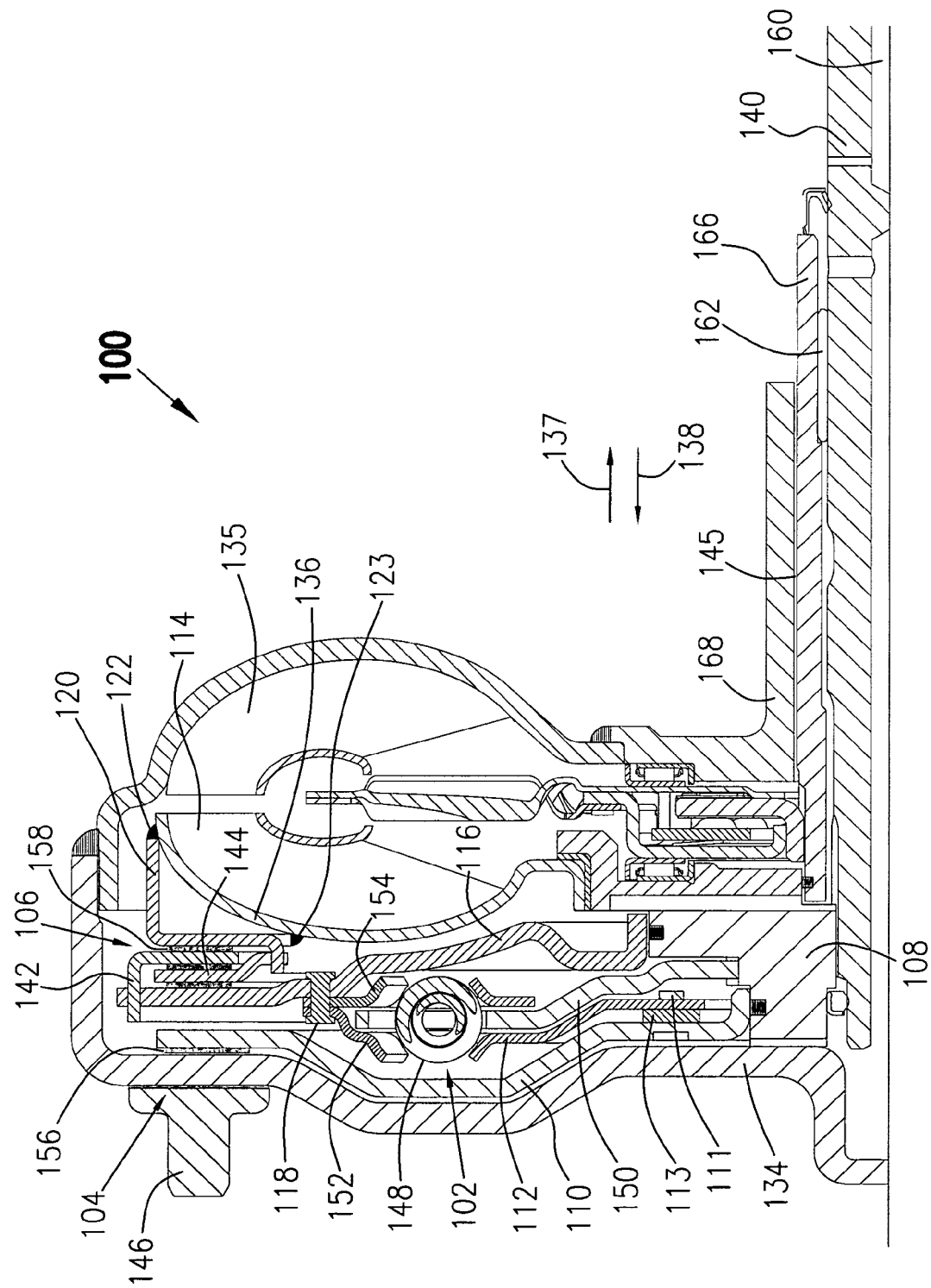
FIG. 8 is a partial cross-sectional view of a present invention torque converter.

FIG. 8 is a partial cross-sectional view of present invention torque converter 100. Torque converter 100 includes damper assembly 102, torque converter, or lock-up, clutch 104 and turbine clutch 106. Assembly 102 is rotationally connected to hub 108. By rotationally connected, or secured, we mean that the assembly and the hub are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

Clutch 104 is rotationally connected to assembly 102. In some aspects, clutch 104 includes piston plate 110, which is rotationally connected to assembly 102 by any means known in the art, for example, extruded rivets 111 connected to plate 112. Clutch 104 also includes biasing element 113, which axially urges plate 110. Biasing element 113 enables axial movement of plate 110 independent of axial movement by assembly 102. Biasing element 113 can be any element known in the art, for example, a leaf spring. Clutch 106 is rotationally connected to assembly 102 and turbine 114. In some aspects, clutch 106 includes piston plate 116, which is connected to the assembly by any means known in the art, for example, rivets 118. In some aspects, clutch 106 includes plate 120, which is rotationally connected to turbine 114 by any means known in the art, for example, welds 122 and 123.

Figure 9:
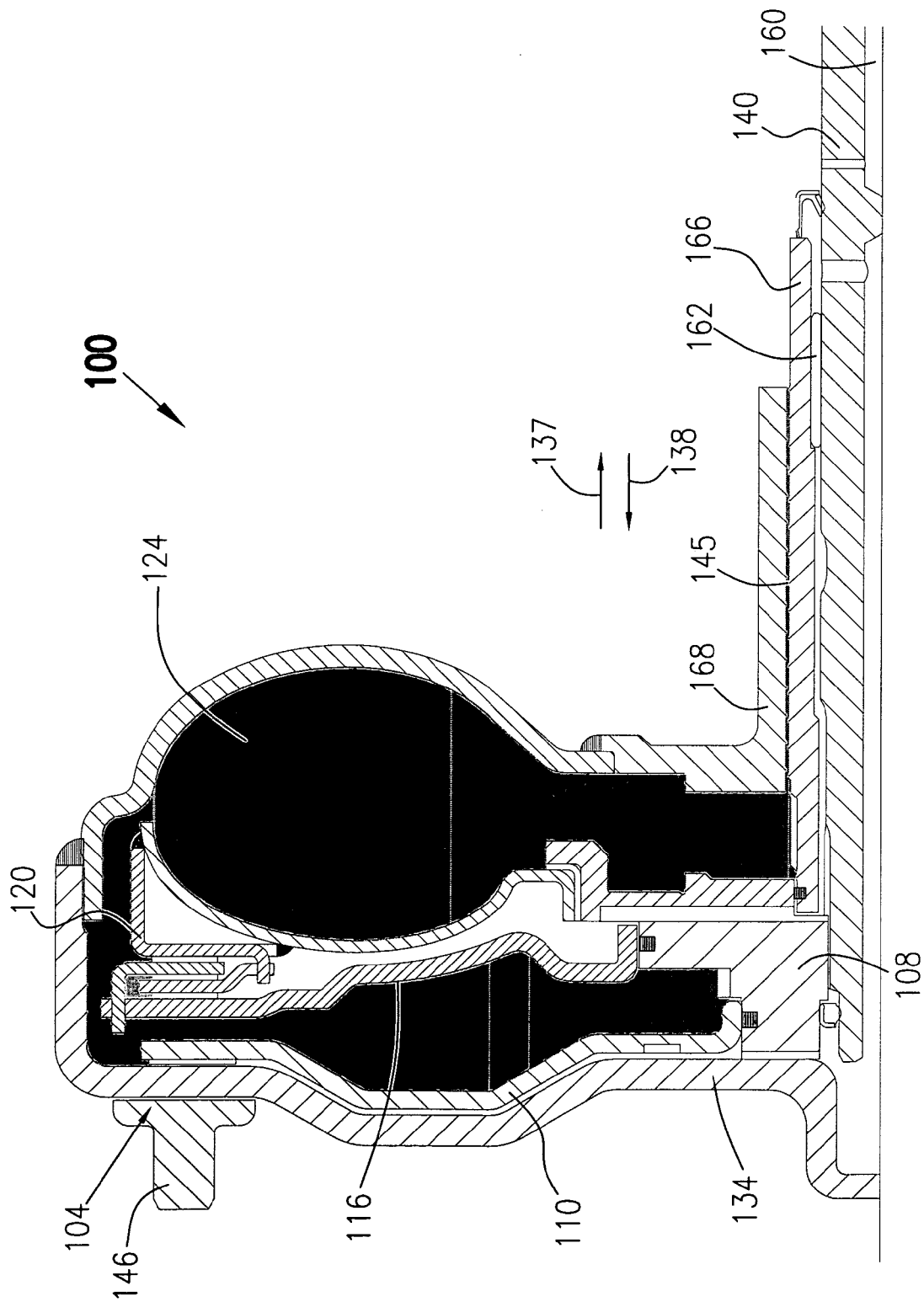
FIG. 9 is a partial cross-sectional view of the torque converter in FIG. 8 showing the impeller charge chamber.

FIG. 9 is a partial cross-sectional view of the torque converter in FIG. 8 showing impeller charge chamber 124.

Figure 10:
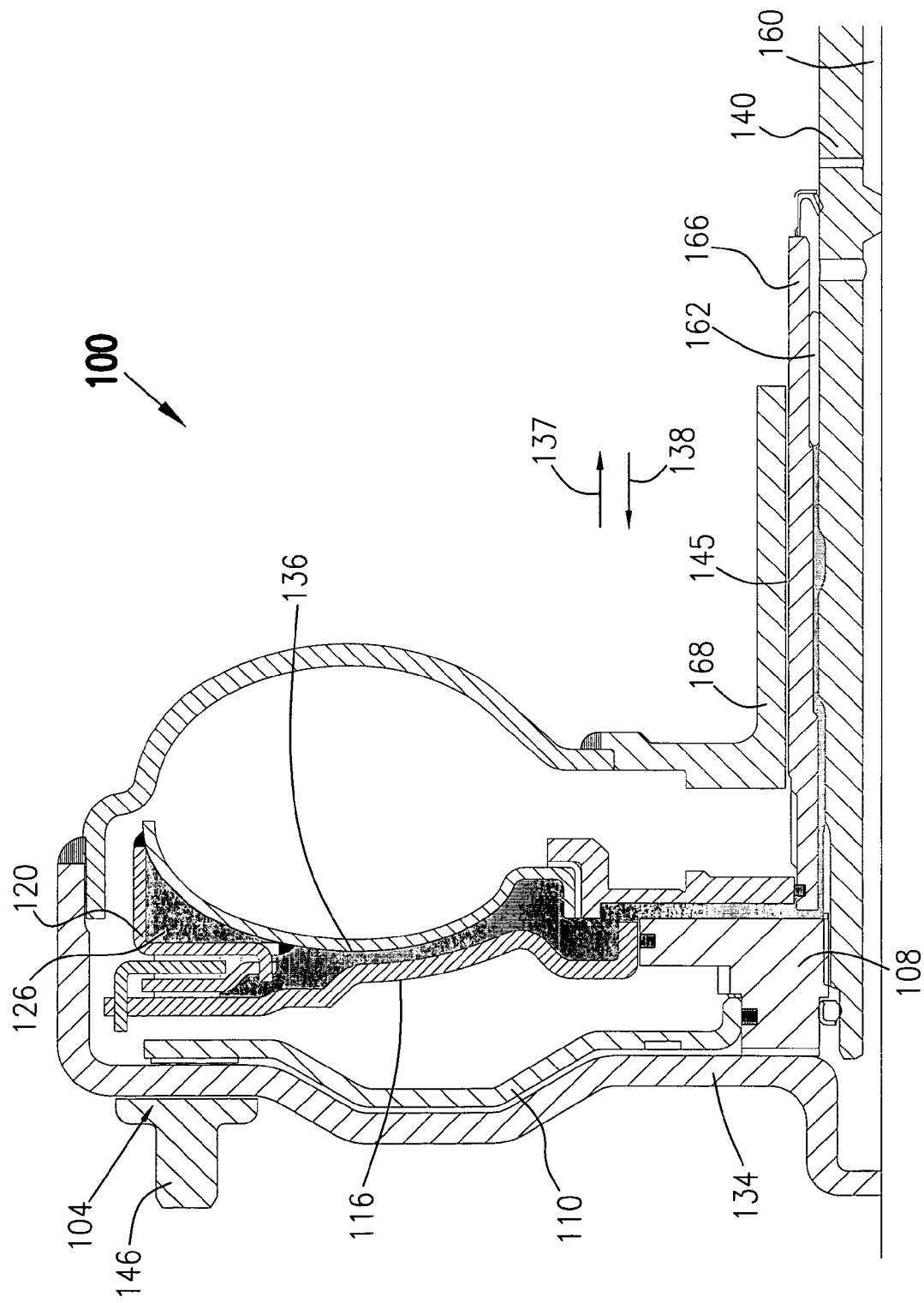
FIG. 10 is a partial cross-sectional view of the torque converter in FIG. 8 showing the inner chamber.
Figure 11:
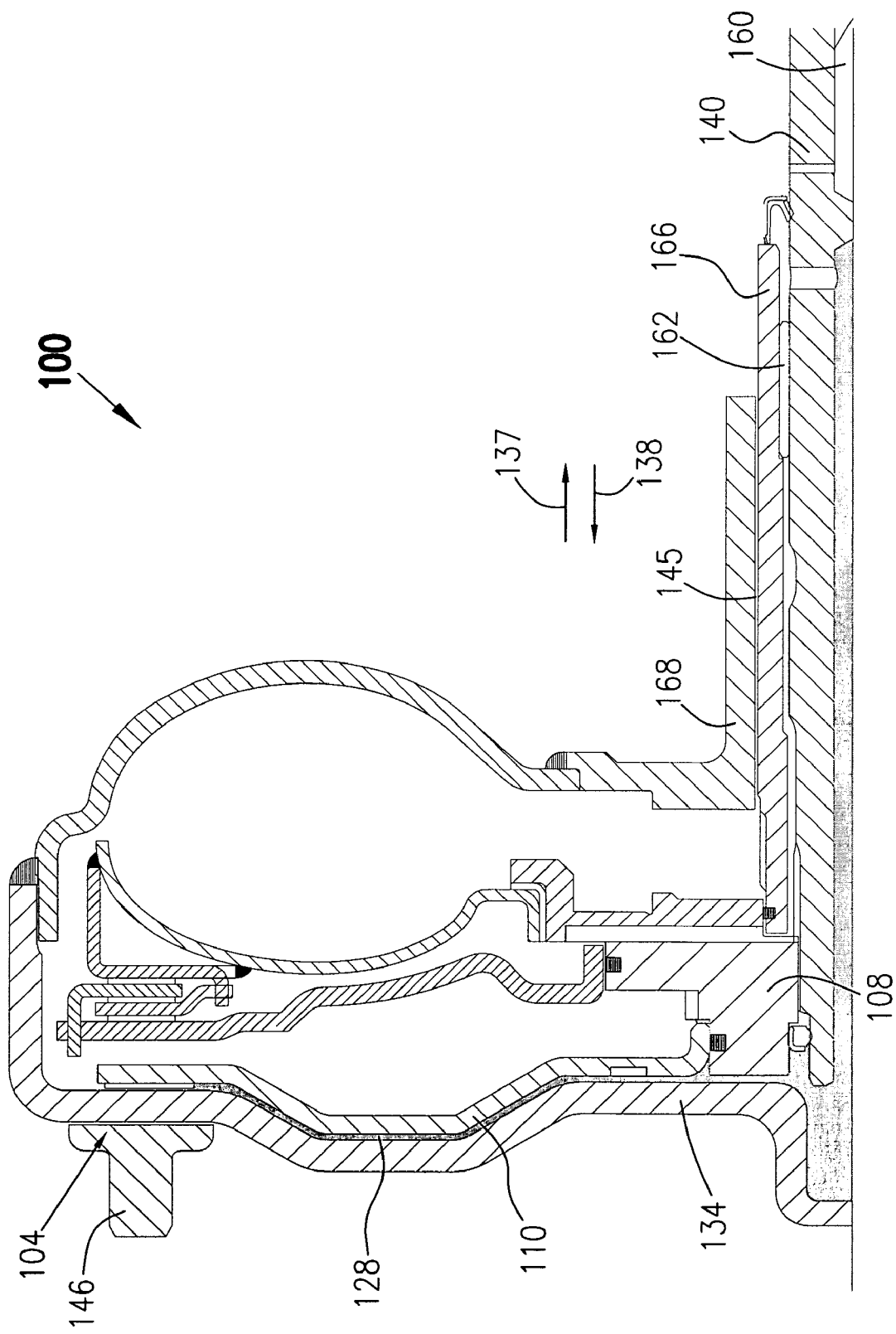
FIG. 11 is a partial cross-sectional view of the torque converter in FIG. 8 showing the outer chamber; and, FIG. 12 is a partial cross-sectional view of the torque converter in FIG. 8 showing torque transmission paths.

FIG. 10 is a partial cross-sectional view of the torque converter in FIG. 8 showing inner chamber 126; and, FIG. 11 is a partial cross-sectional view of the torque converter in FIG. 8 showing outer chamber 128.

Figure 12:
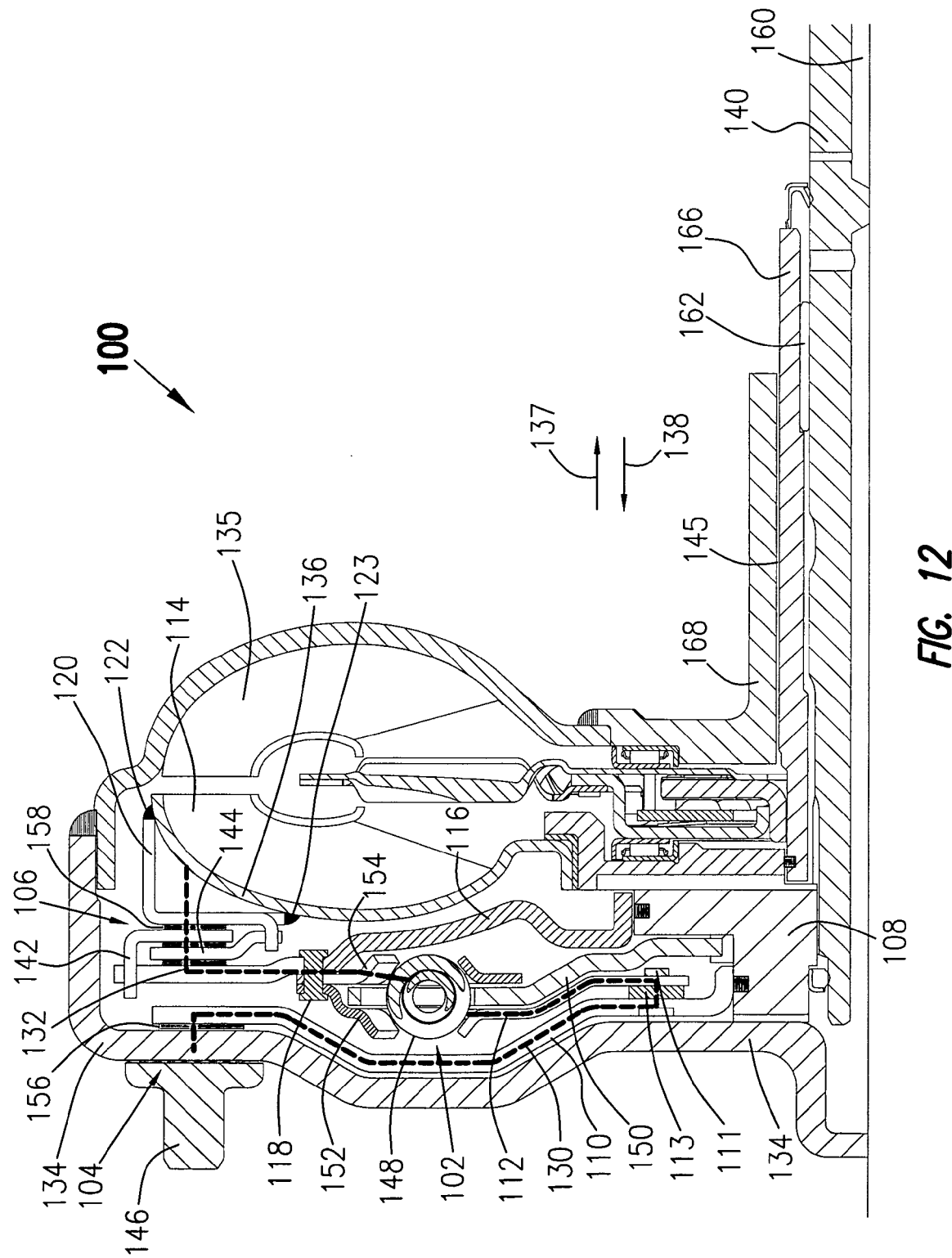

FIG. 12 is a partial cross-sectional view of the torque converter in FIG. 8 showing torque transmission paths 130 and 132. The following should be viewed in light of FIGS. 8 through 12. Clutch 104 is located in a torque transmission path between cover 134 of the torque converter and assembly 102. In some aspects, the path is path 130. Clutch 106 is located in a torque transmission path between turbine 114 and assembly 102. In some aspects, the path is path 132. As described infra, manipulation of the respective hydraulic pressures in chambers 124, 126, and 128 causes the clutches to open and close, which subsequently opens and closes the torque transmission paths. By opening a torque transmission path, we mean breaking or interrupting the path. That is, the path is not able to transmit torque along its full length. Alternately stated, the path is made discontinuous. For example, one end of the torque path may experience a torque, but the torque is not transmitted to the other end. By closing a torque transmission path, we mean making the path continuous so that the path is able to transmit torque along its full length.

Chamber 124 includes turbine 114 and impeller 135 and is at least partially defined by plates 110 and 116. By partially defined, we mean that the plates form at least part of the boundaries or containment of the chamber. Chamber 126 is at least partially defined by plate 116 and turbine shell 136. Chamber 128 is at least partially defined by plate 110 and cover 134.

To operate torque converter 100 in an engine idle mode, that is when an engine (not shown) to which converter 100 is connected operates at idle, both clutch 104 and clutch 106 are opened. To accomplish this, fluid in chamber 124 is maintained at a pressure lower than fluid in chamber 128, axially displacing plate 110 in direction 137 and opening clutch 104. Also, fluid in chamber 126 is maintained at a pressure higher than the fluid in chamber 124, axially displacing plate 116 in direction 138 and opening clutch 106. In this configuration, no torque is transmitted to hub 108, which, when converter 100 is installed in a vehicle (not shown), is rotationally connected to input shaft 140 for a transmission (not shown). Thus, no engine torque is transmitted to the transmission. That is, the turbine and the torque converter cover are disconnected from the hub.

Alternately stated, the hub, which is rotationally connected to the transmission, is disconnected from the portions of the torque converter receiving torque from the engine, specifically, the converter cover and the turbine shell. Thus, the portions of the converter directly or indirectly connected to the engine are disconnected from the hub. Therefore, the inertial load seen by the engine due to the connection of the engine to the torque converter is reduced, improving fuel economy for the engine.

To operate torque converter 100 in a torque converter mode, that is, operating the converter so that turbine 114 multiplies torque from impeller 135, clutch 104 is opened and clutch 106 is closed. To accomplish this, fluid in chamber 124 is maintained at a pressure lower than fluid in chamber 128, axially displacing plate 110 in direction 137 and opening clutch 104. Fluid in chamber 124 is maintained at a pressure higher than the fluid in chamber 126, axially displacing plate 116 in direction 137 and closing clutch 106. In this configuration, path 132 is closed, path 130 is opened, and torque is transmitted from the turbine to assembly 102 and on to hub 108. That is, turbine 114 is rotationally connected to hub 108.

Clutch 106 must be configured to withstand multiplied engine torque (through the torque multiplying action of the turbine). In some aspects, plates 142 and 144 are used to increase the torque bearing capacity of the clutch. However, it should be understood that clutch 106 is not limited to the torque increasing configuration shown and that other means of increasing the torque bearing capacity of clutch 106 are included in the spirit and scope of the claimed invention. During operation in torque converter mode, heat is generated by the turbine and impeller. Advantageously, converter 100 is arranged to provide a flow of fluid through chamber 124 during torque converter mode to cool the turbine and impeller.

Although clutch 106 is shown with a particular configuration of interlocking components, it should be understood that the clutch is not limited to these configuration and other configurations are included within the spirit and scope of the claimed invention. Thus, using the same chamber, hydraulic pressure is manipulated to operate clutches to enable a torque multiplying mode and hydraulic flow is provided to cool to the torus. In some aspects, fluid flows from chamber 128, which is under greater hydraulic pressure than chamber 124, to chamber 124 and through channel 145.

To operate torque converter 100 in a lock-up mode, that is, connecting housing 134 to assembly 102, clutch 104 is closed. In some aspects, clutch 106, which is closed in torque converter mode, remains closed while clutch 104 is closed. In some aspects, clutch 106 is opened in lock-up mode. Specifically, once clutch 104 is closed, clutch 106 is opened. This sequence is further described infra. Keeping clutch 106 closed introduces the inertia of the turbine to the torque transmission path. The turbine inertia can be used to affect the natural frequency of the torque converter during lock-up mode to tune out undesirable resonance.

To close clutch 104, fluid in chamber 124 is maintained at a pressure greater than fluid in chamber 128, axially displacing plate 110 in direction 138. To open clutch 106, fluid in chamber 124 is maintained at a pressure lower than the fluid in chamber 126, axially displacing plate 116 in direction 138. In this configuration, torque from the engine is transmitted along path 130, that is, from the housing to assembly 102 and on to hub 108. That is, cover 134 is rotationally connected to hub 108. If clutch 106 is open, path 132 is open. If clutch 106 is closed, path 132 links the pump inertia to path 130.

It should be understood that the pressures referenced supra are relative and are not restricted to any particular value or range except for the values or ranges inherent in the overall design, configuration, or operation of a particular torque converter 100.

Cover 134 can be connected to the engine by any means known in the art. In some aspects, studs 146 are used. In some aspects, assembly 102 includes a plurality of coil springs 148 mounted on flange 150 and plates 152 and 154.

Friction material 156 is axially disposed between cover 134 and plate 110. Clutch 104 is not limited to any particular type or configuration of friction materials. In some aspects, friction material is fixedly secured to the cover or plate 110. In some aspects (not shown), a clutch plate is disposed axially between the cover and the plate. Friction material 158 is axially disposed between plates 116, 120, 142, and 144. Clutch 106 is not limited to any particular type or configuration of friction materials. In some aspects, friction materials are fixedly secured to the plates. In some aspects (not shown), clutch plates are disposed axially between the plates.

In some aspects, converter 100 includes a three-pass hydraulic system. In this system, channels 145, 160, and 162 transport fluid to and from chambers 124, 128, and 126, respectively. Channel 160 is located inside shaft 140 and is in fluid communication with chamber 128. Channel 162 is radially disposed between shaft 140 and stator shaft 166 and is in fluid communication with chamber 126. Channel 145 is radially disposed between shaft 166 and flange 168 and is in fluid communication with chamber 124.

Figure 1:
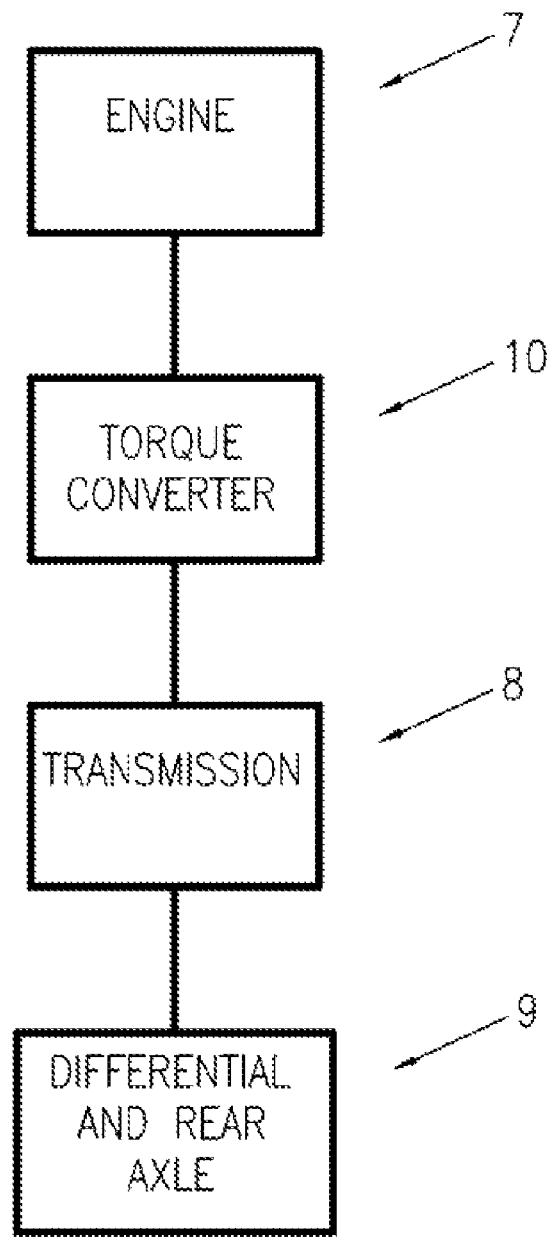
FIG. 1 is a general block diagram illustration of power flow in a motor vehicle, intended to help explain the relationship and function of a torque converter in the drive train thereof.
Figure 2:
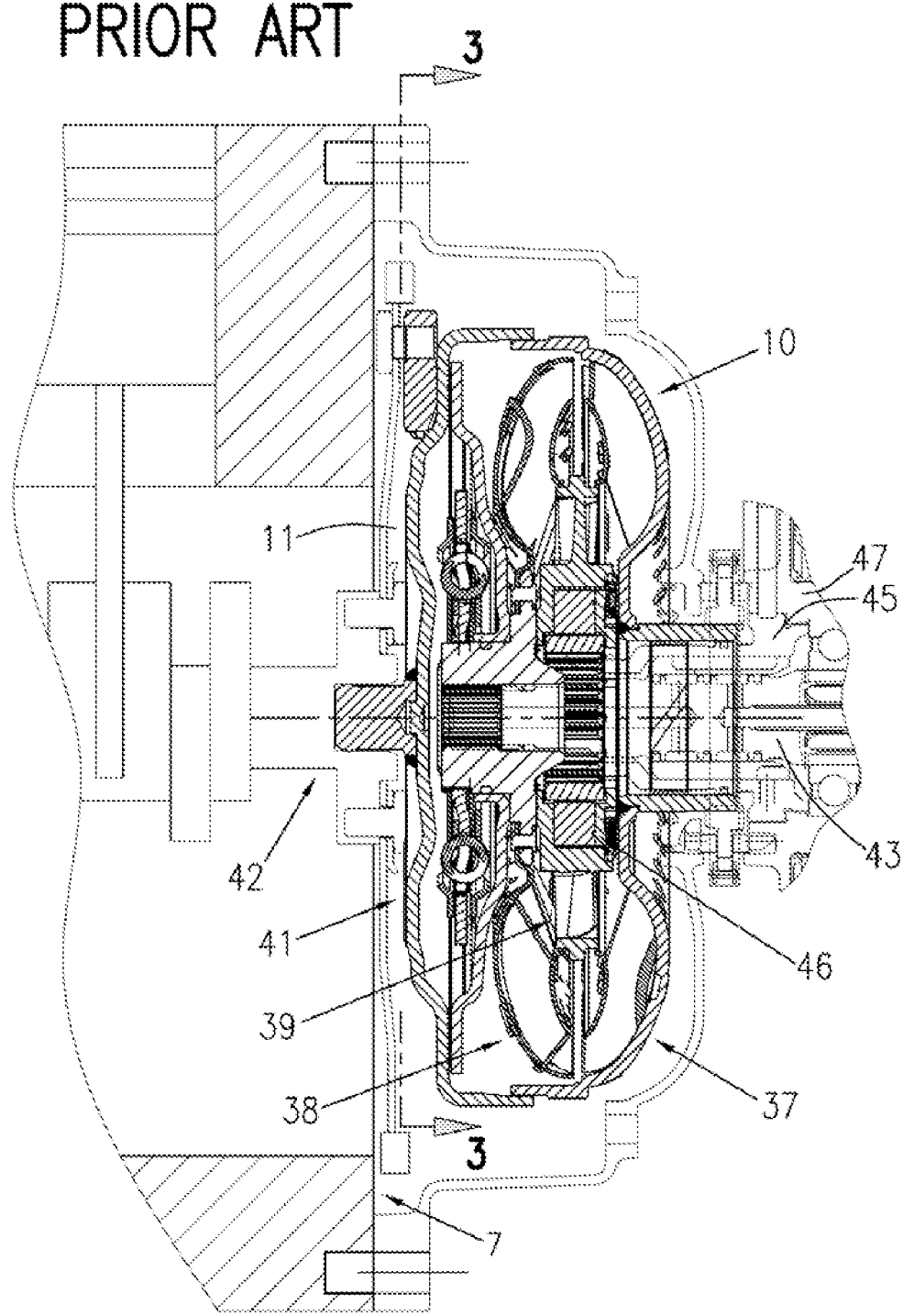
FIG. 2 is a cross-sectional view of a prior art torque converter, shown secured to an engine of a motor vehicle.
Figure 3:
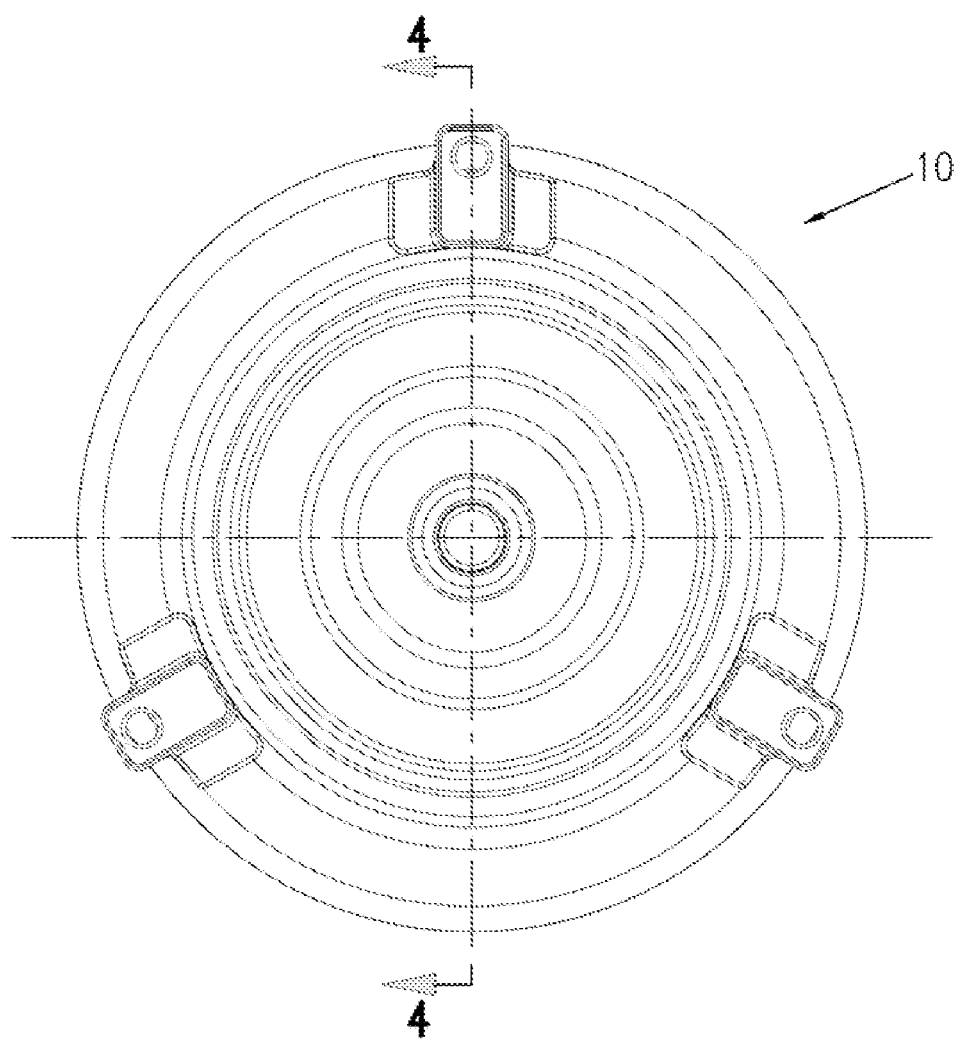
FIG. 3 is a left view of the torque converter shown in FIG. 2, taken generally along line 3-3 in FIG. 2.
Figure 4:
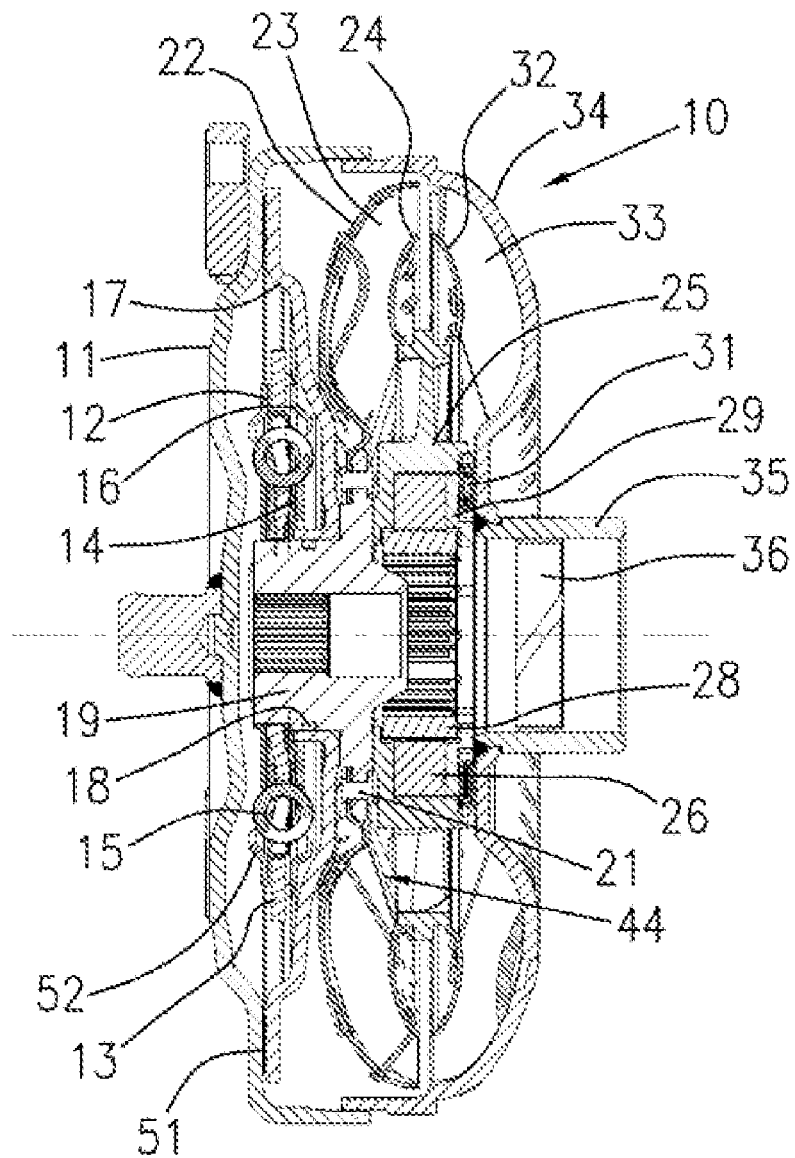
FIG. 4 is a cross-sectional view of the torque converter shown in FIGS. 2 and 3, taken generally along line 4-4 in FIG. 3.
Figure 5:
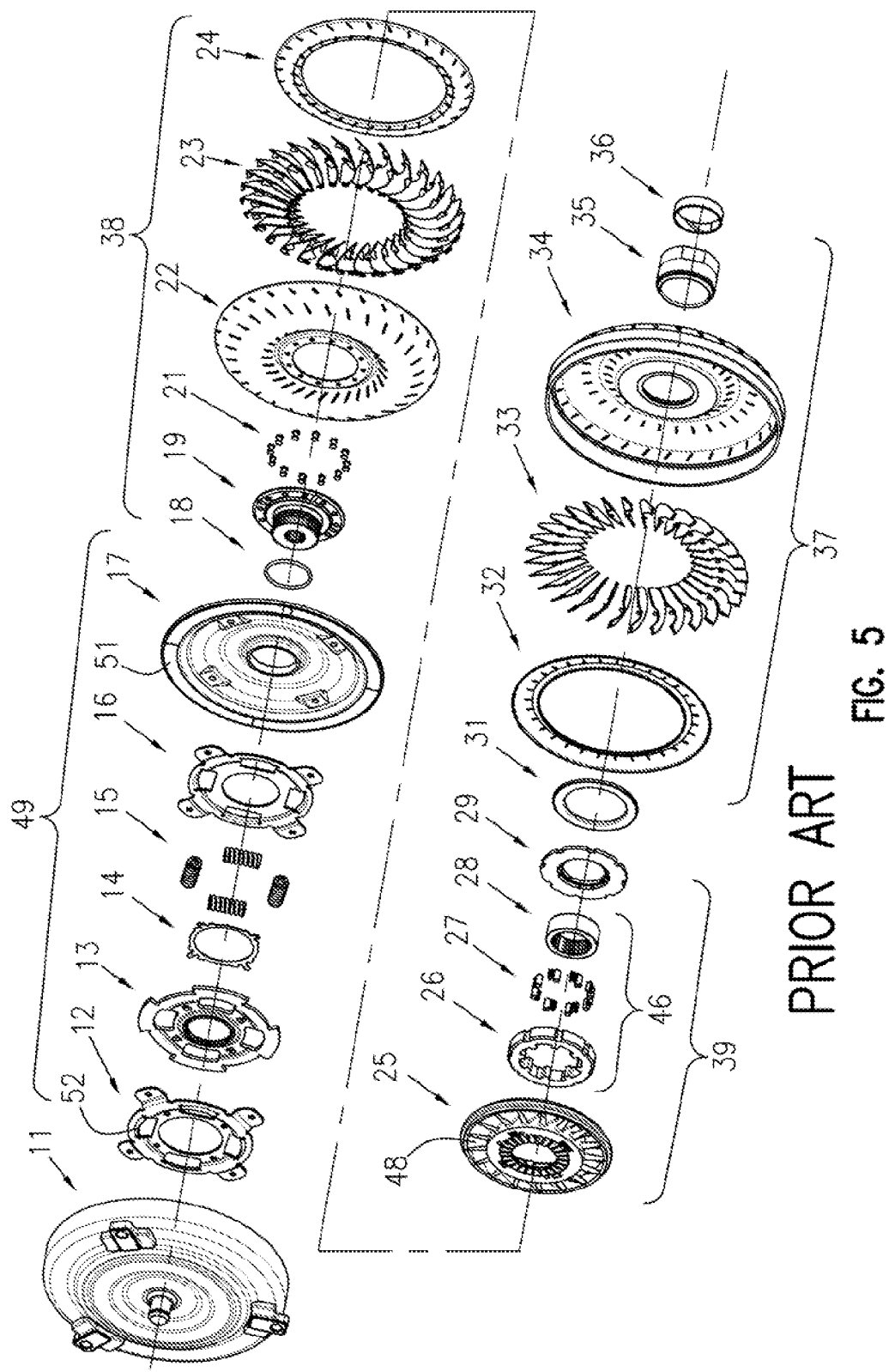
FIG. 5 is a first exploded view of the torque converter shown in FIG. 2, as shown from the perspective of one viewing the exploded torque converter from the left.
Figure 6:
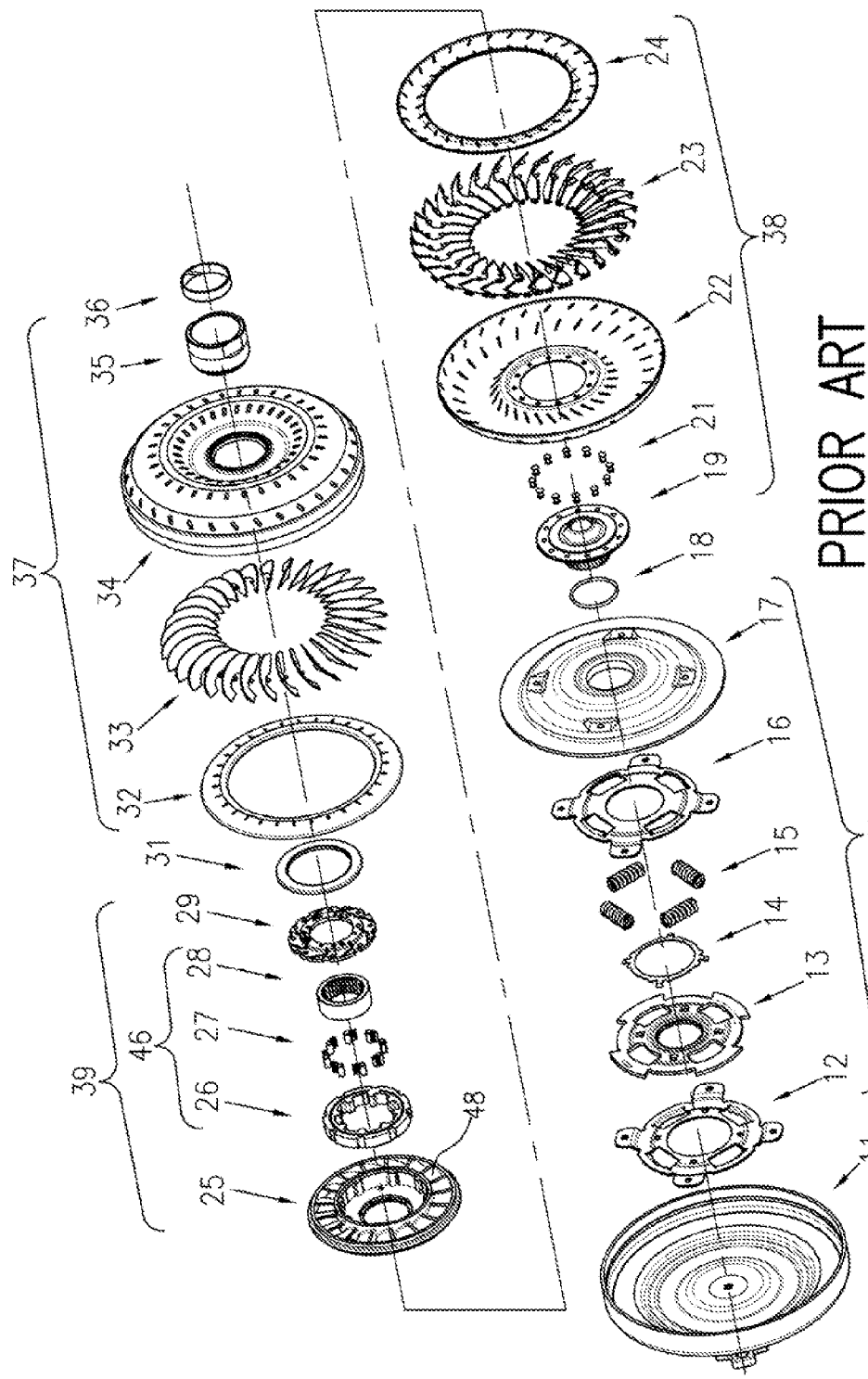
FIG. 6 is a second exploded view of the torque converter shown in FIG. 2, as shown from the perspective of one viewing the exploded torque converter from the right.

The present invention also includes a torque converter presenting a reduced inertial load during engine idle. The converter includes an output hub and a turbine arranged to rotate independent of the output hub. In some aspects, the torque converter includes a damper assembly connected to the hub and to a torque converter cover, and a turbine clutch connected to a turbine and the damper assembly. The turbine clutch is arranged to open during the engine idle mode. Thus, unlike the torque converter shown in FIG. 4, the turbine is not rotationally locked with the output hub during an engine idle mode. For the present invention torque converter, there is no rotational connection between the turbine and the hub during engine idle mode and the turbine can rotate regardless of the rotational status of the hub.

In some aspects, the torque converter is torque converter 100, the hub is hub 108, the turbine is turbine 114, the damper assembly is assembly 102, the converter cover is cover 134, and the turbine clutch is clutch 106.

Clutches 104 and 106 and damper assembly 102 have been shown with specific shapes, sizes, and configurations. However, it should be understood that a present invention torque converter is not limited to the shapes, sizes, and configurations shown and that other shapes, sizes, and configurations in accordance with the descriptions supra are included within the spirit and scope of the claims. Torque converter 100 has been shown with a specific configuration of ancillary components. However, it should be understood that a present invention torque converter is not limited to the specific ancillary parts and configuration of ancillary parts shown in the figures, and that other ancillary parts and configurations are included in the spirit and scope of the claimed invention.

The present invention also includes a method of operating a torque converter. Although the method is described as a sequence of steps for clarity, no order should be inferred unless explicitly stated. A first step varies hydraulic pressure in first, second and third chambers. A second step manipulates respective torque transmission paths between a cover for the torque converter and a damper assembly connected to a hub, and between a turbine and the damper assembly in response to varying the hydraulic pressure. In some aspects, the torque converter is converter 100 and the first through third chambers are chambers 124, 126, and 128, respectively.

In some aspects, varying hydraulic pressure includes maintaining pressure in chamber 124 at a level lower than the respective pressures in chambers 126 and 128, and manipulating respective torque transmission paths includes opening the torque transmission path between cover 114 and damper assembly 102, and opening the torque transmission path between the turbine and the damper assembly. This is an engine idle mode in which no torque is transmitted to shaft 140, since clutches 104 and 106 are both open. This mode advantageously reduces the load on the vehicle engine, increasing fuel economy for the engine.

In some aspects, varying hydraulic pressure includes maintaining pressure in chamber 124 at a level lower than the pressure in chamber 128, and maintaining pressure in chamber 126 at a pressure lower than the pressure in chamber 124. Then, manipulating respective torque transmission paths includes opening the torque transmission path between the cover and the damper assembly and closing the torque transmission path between the turbine and the damper assembly. This is the torque converter mode in which clutch 104 is open, clutch 106 is closed, and turbine 114 multiplies torque from impeller 135. The method also includes flowing the fluid in chamber 124 through the chamber to cool the turbine and the impeller.

In some aspects, varying hydraulic pressure includes maintaining pressure in chamber 124 at a level higher than the pressure in chamber 128. Then, manipulating respective torque transmission paths includes closing the torque transmission path between the cover and the damper assembly. This is the lock-up mode in which clutch 104 is closed and torque is transmitted from the cover to the transmission shaft.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A torque converter comprising:
   first, second, and third hydraulic chambers sealable with respect to each other and with separate respective channels disposed at respective radially inward portions of the chambers;
   a damper assembly connected to a hub and including a plurality of springs and a cover plate for transmitting torque to the plurality of springs;
   a turbine;
   a turbine clutch connected to the turbine and fixedly connected to the cover plate for said damper assembly; and,
   a torque converter clutch including a portion of a cover for said torque converter and including a first piston plate connected to the cover plate for said damper assembly, wherein when the turbine clutch is in an open position, the turbine and the damper are able to rotate independent of each other.

2. The torque converter of claim 1 wherein in an engine idle mode, said turbine clutch and said torque converter clutch are disengaged and said turbine and said torque converter cover are rotationally disconnected from said hub.

3. The torque converter of claim 2 wherein said torque converter clutch comprises a second piston plate; and,
   said torque converter further comprising an impeller; a turbine shell; a first chamber including said turbine and said impeller and at least partially defined by said first and second piston plates; a second chamber at least partially defined by said first piston plate and said turbine shell; and a third chamber at least partially defined by said torque converter cover and said second piston plate, wherein in said engine idle mode, pressure for fluid in said first chamber is arranged to be less than pressures for respective fluids in said second and third chambers.

4. The torque converter of claim 1 wherein in a torque converter mode, said turbine clutch is engaged, said torque converter clutch is disengaged, and said turbine clutch rotationally connects said turbine and said damper assembly.

5. The torque converter of claim 4 wherein said torque converter clutch comprises a second piston plate; and, said torque converter further comprising an impeller; a turbine shell; a first chamber including said turbine and said impeller and at least partially defined by said first and second piston plates; a second chamber at least partially defined by said first piston plate and said turbine shell; and a third chamber at least partially defined by said torque converter cover and said second piston plate, wherein in said torque converter mode, pressure for fluid in said first chamber is arranged to be less than pressure for fluid in said third chamber and pressure for fluid in said first chamber is arranged to be greater than pressure for fluid in said second chamber.

6. The torque converter of claim 5 wherein said fluid in said first chamber is arranged to flow through said first chamber.

7. The torque converter of claim 1 wherein in a lock-up mode said torque converter clutch is engaged and said torque converter clutch rotationally connects said torque converter cover and said damper assembly.

8. The torque converter of claim 7 wherein said turbine clutch is engaged.

9. The torque converter of claim 7 wherein said turbine clutch is open.

10. The torque converter of claim 7 wherein said torque converter clutch comprises a second piston plate; and, said torque converter further comprising an impeller; a turbine shell; a first chamber including said turbine and said impeller and at least partially defined by said first and second piston plates; a second chamber at least partially defined by said first piston plate and said turbine shell; and a third chamber at least partially defined by said torque converter cover and said second piston plate, wherein in said lock-up mode, pressure for fluid in said first chamber is arranged to be greater than pressure for fluid in said third chamber.

11. The torque converter of claim 1 wherein said damper assembly comprises a plurality of coil springs mounted upon a flange.

12. A torque converter presenting a reduced inertial load during engine idle mode comprising:

a damper assembly;
a single output hub;
a turbine arranged to rotate independent of said output hub; and,
a turbine clutch connected to the damper assembly and to the turbine and including a piston plate fixedly secured to the damper assembly and displaceable to open and close the turbine clutch, wherein the damper assembly is connected to said hub and to a torque converter cover and wherein said turbine clutch is arranged to open during said engine idle mode.

13. A method of operating a torque converter comprising the steps of:

rotating a hub for the torque converter independent of a turbine for the torque converter;
varying hydraulic pressure in first, second and third chambers; and,
opening and closing, in response to said varying said hydraulic pressure, respective torque transmission paths between a cover for said torque converter and a damper assembly connected to the hub and between the turbine and said damper assembly, wherein varying hydraulic pressure further comprises maintaining pressure in said first chamber at a level lower than the respective pressures in said second and third chambers and wherein manipulating respective torque transmission paths further comprises opening said respective torque transmission paths.

14. The method of claim 13 wherein varying hydraulic pressure further comprises maintaining pressure in said first chamber at a level lower than the pressure in said third chamber and maintaining pressure in said second chamber at a pressure lower than the pressure in said first chamber and wherein manipulating respective torque transmission paths further comprises opening said torque transmission path between said cover and said damper assembly and closing said torque transmission path between said turbine and said damper assembly.

15. The method of claim 14 further comprising flowing said fluid in said first chamber through said first chamber.

16. The method of claim 13 wherein varying hydraulic pressure further comprises maintaining pressure in said first chamber at a level higher than the pressure in said third chamber and wherein manipulating respective torque transmission paths further comprises closing said torque transmission path between said cover and said damper assembly.

17. The method of claim 16 wherein varying hydraulic pressure further comprises maintaining pressure in said second chamber at a pressure higher than the pressure in said first chamber and wherein manipulating respective torque transmission paths further comprises opening said torque transmission path between said turbine and said damper assembly.

* * * * *

UNITED STATES PATENT AND TRADEMARK OFFICE
CERTIFICATE OF CORRECTION

PATENT NO. : 7,980,992 B2
APPLICATION NO. : 11/999949
DATED : July 19, 2011
INVENTOR(S) : Todd J. Sturgin Page 1 of 1

It is certified that error appears in the above-identified patent and that said Letters Patent is hereby corrected as shown below:

In the Claims:
Correct column 10 as follows:

In Claim 3, lines 57-58: said torque converter further comprising an impeller --and-- a turbine shell; --wherein-- "a" --the-- first chamber "including" --includes-- said turbine and said impeller and --is-- at least;
In Claim 3, line 60: --wherein-- "a" --the-- second chamber --is-- at least;
In Claim 3, line 62: --wherein-- "a" --the-- third chamber --is-- at least;

Correct column 11 as follows:

In Claim 5, lines 7-8: said torque converter further comprising an impeller --and-- a turbine shell; --wherein-- "a" --the-- first chamber "including" --includes-- said turbine and said impeller and --is-- at least;
In Claim 5, line 10: --wherein-- "a" --the-- second chamber --is-- at least;
In Claim 5, line 12: --wherein-- "a" --the-- third chamber --is-- at least;
In Claim 10, lines 31-32: said torque converter further comprising an impeller --and-- a turbine shell; --wherein-- "a" --the-- first chamber "including" --includes-- said turbine and said impeller and --is-- at least;
In Claim 10, line 34: --wherein-- "a" --the-- second chamber --is-- at least;
In Claim 10, line 36: --wherein-- "a" --the-- third chamber --is-- at least;

Signed and Sealed this
Twelfth Day of March, 2013

Teresa Stanek Rea
*Acting Director of the United States Patent and Trademark Office*